United States Patent
Wu et al.

(10) Patent No.: US 10,824,847 B2
(45) Date of Patent: Nov. 3, 2020

(54) GENERATING VIRTUALLY STAINED IMAGES OF UNSTAINED SAMPLES

(71) Applicant: Verily Life Sciences LLC, South San Francisco, CA (US)

(72) Inventors: Cheng-Hsun Wu, San Bruno, CA (US); Huang-Wei Chang, Sunnyvale, CA (US); James Higbie, San Mateo, CA (US); Andrew Homyk, Belmont, CA (US); Charles Santori, Palo Alto, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 140 days.

(21) Appl. No.: 16/217,262

(22) Filed: Dec. 12, 2018

(65) Prior Publication Data

US 2019/0188446 A1 Jun. 20, 2019

Related U.S. Application Data

(60) Provisional application No. 62/599,271, filed on Dec. 15, 2017.

(51) Int. Cl.
*G06K 9/00* (2006.01)
*G06T 11/00* (2006.01)
(Continued)

(52) U.S. Cl.
CPC ......... *G06K 9/0014* (2013.01); *G06K 9/6256* (2013.01); *G06T 3/0075* (2013.01); *G06T 11/001* (2013.01)

(58) Field of Classification Search
CPC .. G06K 9/0014; G06K 9/6256; G06T 3/0075; G06T 11/001
See application file for complete search history.

(56) References Cited

U.S. PATENT DOCUMENTS

2011/0074944 A1 3/2011 Can et al.
2011/0311124 A1* 12/2011 Ohnishi ............... G06T 7/0012
382/134
(Continued)

FOREIGN PATENT DOCUMENTS

WO 2012148893 11/2012

OTHER PUBLICATIONS

Christiansen et al., "In Silico Labeling: Predicting Fluorescent Labels in Unlabeled Images", CellPress No. 173, Apr. 19, 2018, pp. 792-803.e19.
(Continued)

*Primary Examiner* — Pakee Fang
(74) *Attorney, Agent, or Firm* — Kilpatrick Townsend & Stockton LLP

(57) ABSTRACT

Systems and methods for generating virtually stained images of unstained samples are provided. According to an aspect of the invention, a method includes accessing an image training dataset including a plurality of image pairs. Each image pair includes a first image of an unstained first tissue sample, and a second image acquired when the first tissue sample is stained. The method also includes accessing a set of parameters for an artificial neural network, wherein the set of parameters includes weights associated with artificial neurons within the artificial neural network; training the artificial neural network by using the image training dataset and the set of parameters to adjust the weights; accessing a third image of a second tissue sample that is unstained; using the trained artificial neural network to generate a virtually stained image of the second tissue sample from the third image; and outputting the virtually stained image.

20 Claims, 8 Drawing Sheets

(51) Int. Cl.
    *G06K 9/62*    (2006.01)
    *G06T 3/00*    (2006.01)

(56) References Cited

U.S. PATENT DOCUMENTS

| | | |
|---|---|---|
| 2014/0221813 A1 | 8/2014 | Bryant-Greenwood et al. |
| 2014/0270457 A1 | 9/2014 | Bhargava |
| 2016/0196648 A1* | 7/2016 | Madabhushi ........ C07K 16/468 382/131 |
| 2017/0140533 A1* | 5/2017 | Nelson ............... A61K 31/5578 |
| 2017/0343477 A1 | 11/2017 | Santori et al. |
| 2017/0343784 A1 | 11/2017 | Wu et al. |
| 2017/0343824 A1 | 11/2017 | Sinha et al. |
| 2018/0012356 A1* | 1/2018 | Madabhushi ........ G06K 9/6267 |
| 2018/0365829 A1* | 12/2018 | Madabhushi ............. G06T 7/40 |

OTHER PUBLICATIONS

Gareau et al., "The feasibility of digitally stained multimodal confocal mosaics to simulate histopathology", NIH Public Access Author Manuscript, J Biomed Opt. 2009; 14(3), Aug. 27, 2010, pp. 1-6.

GE Global Research, "Molecular Pathology (MultiOmyx™) Visualizes Cancer", via internet at https://www.geglobalresearch.com/blog/molecular-pathology-multiomyx%E2%84%A2-visualizes-cancer, Aug. 14, 2017, 4 pages.

Giacomelli et al., "Virtual Hematoxylin and Eosin Transillumination Microscopy Using Epi-Fluorescence Imaging", PLoS ONE 11(8), Aug. 8, 2016, pp. 1-13.

Orringer et al., "Rapid intraoperative histology of unprocessed surgical specimens via fibre-laser-based stimulated Raman scattering microscopy", HHS Public Access Author manuscript, Nat Biomed Eng., Sep. 25, 2017, pp. 1-25.

Rivenson et al., "Deep learning-based virtual histology staining using autofluorescence of label-free tissue", University of California, Los Angeles, CA, arXiv:1803.11293, Mar. 30, 2018, 22 pages.

PCT/US2018/065087, "International Search Report and Written Opinion", dated May 27, 2019, 13 pages.

* cited by examiner

GENERATING VIRTUALLY STAINED IMAGES OF UNSTAINED SAMPLES

CROSS-REFERENCE TO RELATED APPLICATION

This application claims priority under 35 U.S.C. § 119 to U.S. Provisional Patent Application No. 62/599,271, filed on Dec. 15, 2017, the contents of which are hereby incorporated by reference in their entirety for all purposes.

BACKGROUND OF THE INVENTION

Various stains may be used in histology to study cells and tissues under a microscope. Because biological tissue has little contrast under a microscope, stains are often used to provide contrast and highlight particular features of interest. Stains allow pathologists to image subcellular components and distinguish different cell types and tissue elements. For example, hematoxylin and eosin (H&E) has been a gold standard for diagnosing various diseases for at least a century. Hematoxylin is a dark blue or purple stain that binds to basophilic substances, while eosin is a red or pink stain that binds to acidophilic substances. H&E stains a cell nucleus purple and cytoplasm pink.

In order to prepare a biological sample for analysis, the sample is typically fixed, dehydrated, embedded in paraffin, sectioned, stained, and mounted on a microscope slide. However, this sample preparation can take a day to complete. The staining typically requires 30 minutes for a paraffin-embedded sample and 15 minutes for a frozen sample. This hinders real-time evaluation and immediate feedback in an operating room, where time is critical. Further, the staining does not provide detailed molecular information for further systematic analyses of the tissue, and the staining process can damage biomolecules such as proteins and ribonucleic acids (RNAs).

One method uses two-channel imaging of stimulated Raman scattering microscopy to generate virtual images of H&E staining. However, this method requires a sophisticated laser system that includes pulsed fiber lasers, and is based on a point scanning system that operates at slow speeds. Other methods use various microscopy techniques, such as single-channel epi-fluorescence multiphoton microscopy or single-channel fluorescence confocal microscopy, to generate virtual images of H&E staining. However, these methods require the sample to be stained with different dyes, such as 4',6-diamidino-2-phenylindole (DAPI) or acridine orange.

SUMMARY OF THE INVENTION

Exemplary embodiments of the invention provide systems and methods for generating virtually stained images of unstained samples. According to an aspect of the invention, a computer-implemented method includes accessing an image training dataset that includes a plurality of image pairs. Each image pair of the plurality of image pairs includes a first image of a first tissue sample that is acquired when the first tissue sample is unstained, and a second image of the first tissue sample that is acquired when the first tissue sample is stained. The first image includes a first plurality of spectral images of the first tissue sample. Each spectral image of the first plurality of spectral images includes data from a different wavelength band. The second image includes a plurality of colors that indicate, for each location of a plurality of locations within the second image, an extent to which at least one stain binds to the first tissue sample.

The method also includes accessing a set of parameters for an artificial neural network. The set of parameters includes weights associated with artificial neurons within the artificial neural network. The artificial neural network is trained by using the image training dataset and the set of parameters to adjust the weights. A third image of a second tissue sample that is unstained is accessed. The third image includes a third plurality of spectral images of the second tissue sample, and each spectral image of the third plurality of spectral images includes data from a different wavelength band. The trained artificial neural network is used to generate a virtually stained image of the second tissue sample from the third image, and the virtually stained image is output.

The method may also include, for each of the plurality of image pairs, spatially registering the first image with the second image such that each pixel in the first image is correlated with a respective pixel in the second image that is located at the same spatial coordinates. Spatially registering the first image with the second image may include using an affine transformation by maximizing mutual information.

Training the artificial neural network may include using the first images as features and using the second images as labels. An output layer of the artificial neural network may include three artificial neurons that respectively predict red, blue, and green channels of the virtually stained image. The artificial neural network may be a convolutional neural network, and training the artificial neural network may include identifying points, edges, connective elements, and/or correlations between attributes within the first image and the second image.

The second tissue sample may include a tissue type that is the same as a tissue type of the first tissue sample.

According to another aspect of the invention, a system is provided that includes one or more data processors and a non-transitory computer readable storage medium containing instructions which when executed on the one or more data processors, cause the one or more data processors to perform the actions discussed above. According to yet another aspect of the invention, a computer-program product tangibly embodied in a non-transitory machine-readable storage medium is provided. The computer-program product includes instructions configured to cause one or more data processors to perform the actions discussed above.

Other objects, advantages, and novel features of the present invention will become apparent from the following detailed description of the invention when considered in conjunction with the accompanying drawings.

BRIEF DESCRIPTION OF THE DRAWINGS

The present disclosure is described in conjunction with the appended figures.

DETAILED DESCRIPTION OF THE INVENTION

Figure 1:
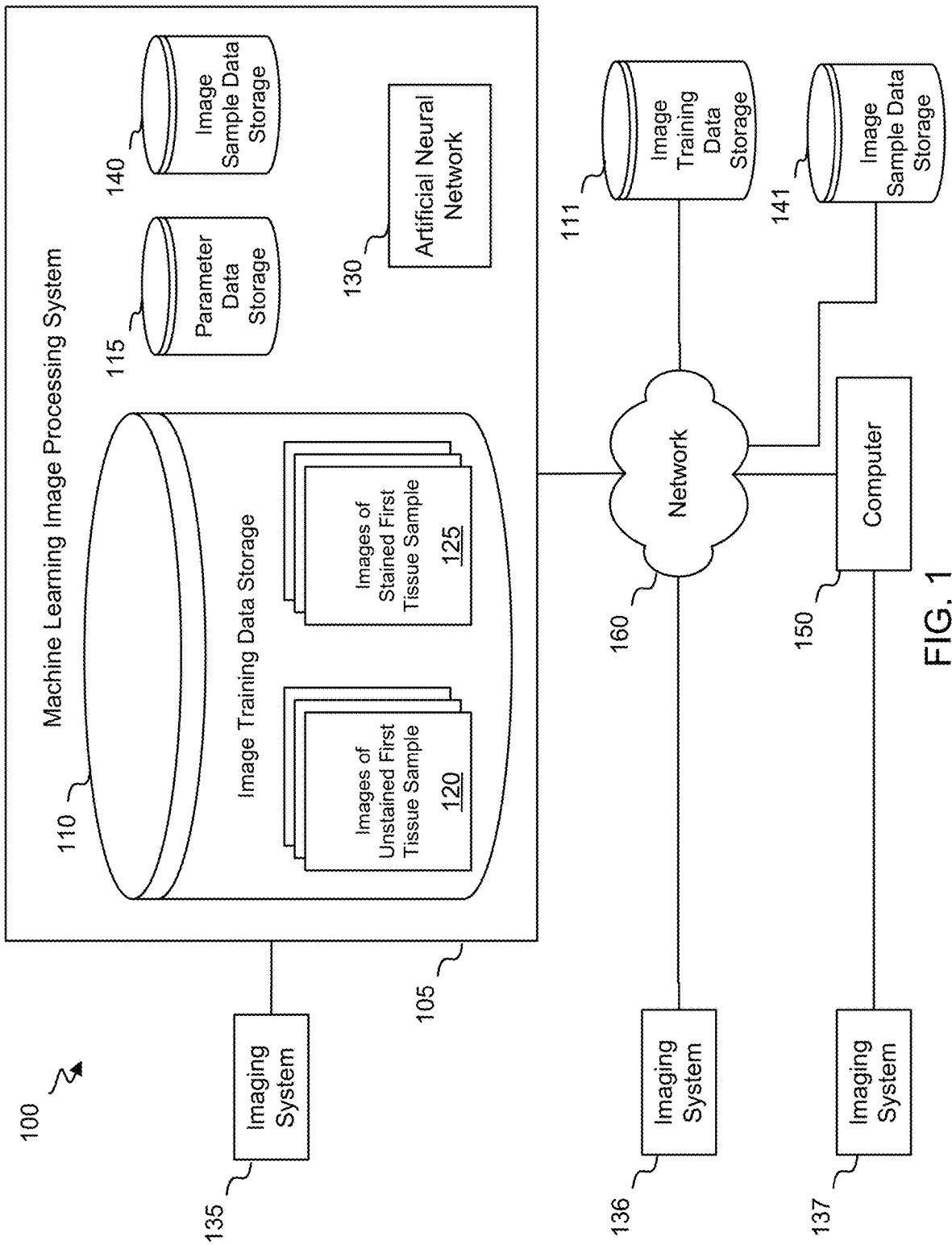
FIG. 1 shows a block diagram of a system for generating virtually stained images of unstained samples according to exemplary embodiments of the invention.

FIG. 1 shows a block diagram of a system 100 for generating virtually stained images of unstained samples according to exemplary embodiments of the invention. As shown in FIG. 1, the system 100 includes a machine learning image processing system 105 and an imaging system 135. The machine learning image processing system 105 may include one or more computers, each of which may include one or more processors and/or a transceiver for communicating with the imaging system 135. The machine learning image processing system 105 may communicate with the imaging system 135 by any suitable connection, such as a wired or wireless network based on Bluetooth or WiFi. Alternatively, the machine learning image processing system 105 and the imaging system 135 may be co-located within a microscope.

The machine learning image processing system 105 may include image training data storage 110, parameter data storage 115, image sample data storage 140, and an artificial neural network 130. Alternatively, some or all of these components may be located remotely, such as in the cloud. Further, some or all of these components may be located within the imaging system 135. The image training data storage 110 may include a plurality of images 120 of an unstained first tissue sample, and a plurality of images 125 of the first tissue sample after it has been stained. Each of the images 120 includes a plurality of spectral images of the unstained first tissue sample, while each of the images 125 includes a plurality of colors that indicate, for each location of a plurality of locations within the image, an extent to which at least one stain binds to the first tissue sample at the location. The parameter data storage 115 may include a set of parameters that characterize the artificial neural network 130. As described in further detail below, the images 120, the images 125, and the parameters may be used to train the artificial neural network 130. Once the artificial neural network 130 has been trained, the artificial neural network 130 may generate virtually stained images from images stored in the image sample data storage 140, wherein each of the images stored in the image sample data storage 140 includes a plurality of spectral images of an unstained second tissue sample.

The first tissue sample may be stained by a variety of methods. For example, the first tissue sample may be stained with a structural stain, such as H&E or Trichrome. Alternatively, the first tissue sample may be stained with a molecular stain, such as CD68 IHC or CD163 IF. Some examples of molecular staining methods that may be used to stain the first tissue sample include immunohistochemistry (IHC), immunofluorescence (IF), in situ hybridization (ISH), fluorescent in situ hybridization (FISH), and RNA (f)ISH. As additional examples, the first tissue sample may be stained with Giemsa stain or Picrosirius red.

The imaging system 135 may be a microscope. As discussed in further detail below, the imaging system 135 may be operated in various modes in order to acquire different images of a sample. For example, the imaging system 135 may be used to acquire the images 120 and the images 125 that are stored in the image training data storage 110. Further, the imaging system 135 may be used to acquire the images that are stored in the image sample data storage 140.

The system 100 may also include a computer 150 that communicates with the machine learning image processing system 105 via a network 160. The computer 150 may also communicate with a standalone imaging system 137 that may perform similar functions as the imaging system 135 discussed above. The computer may access images 120 and images 125 directly from the imaging system 137, or via the network 160 from the image training data storage 110 or another image training data storage 111 that may be located in the cloud. Further, the computer may access images via the network 160 from the image sample data storage 140 or another image sample data storage 141 that may be located in the cloud. In addition, the system 100 may include an imaging system 136 that may be a smart microscope, and that may perform similar functions as the imaging system 135 discussed above.

Figure 2:
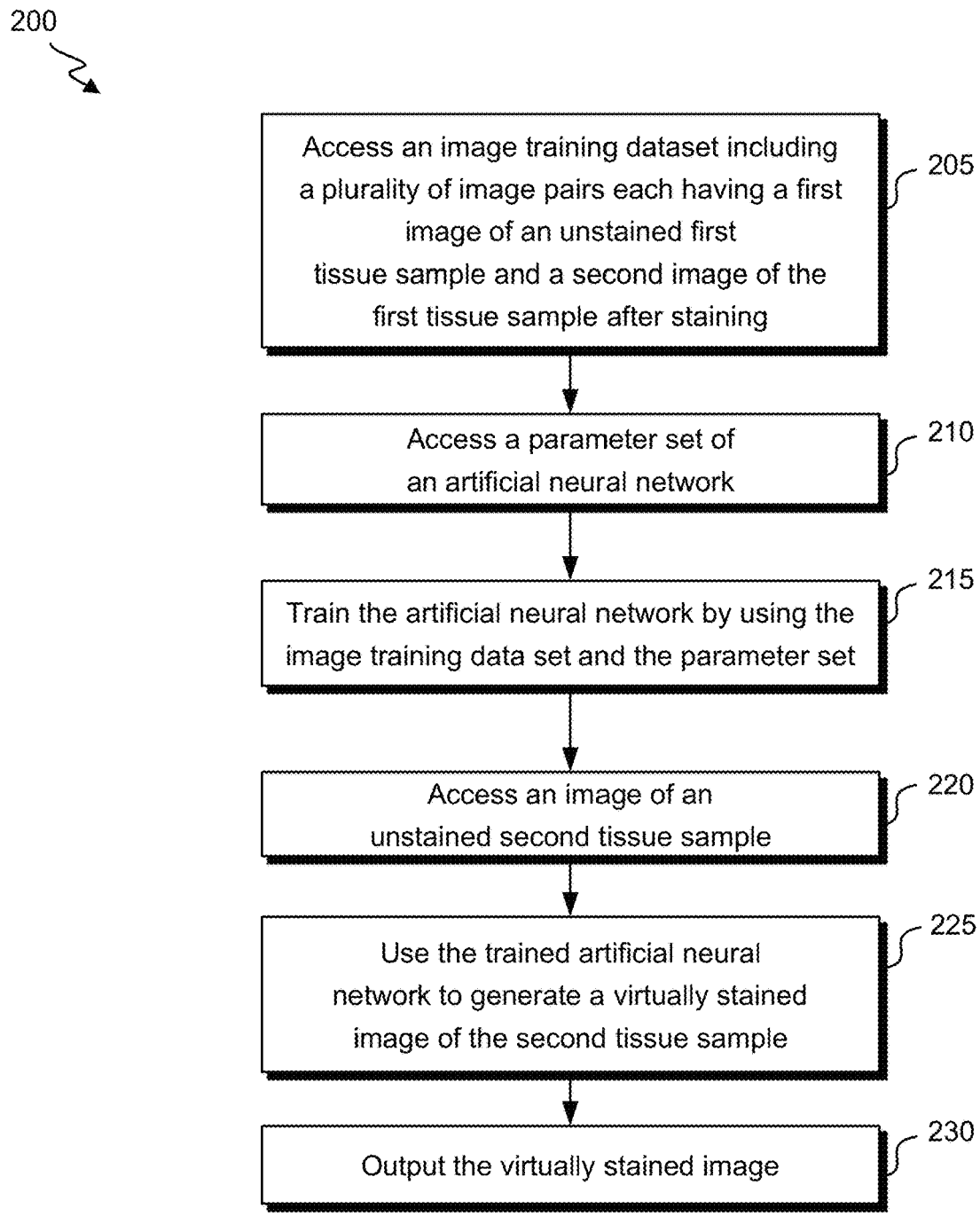
FIG. 2 shows a flow diagram of a method for generating virtually stained images of unstained samples according to exemplary embodiments of the invention.

FIG. 2 shows a flow diagram of a method 200 for generating virtually stained images of unstained samples according to exemplary embodiments of the invention. At block 205, an image training dataset is accessed. For example, the image training dataset may be accessed from the image training data storage 110 or the image training data storage 111. The image training dataset includes a plurality of image pairs, each of which includes a first image 120 of an unstained first tissue sample and a second image 125 of the first tissue sample after staining. As discussed in further detail below, the first image 120 and the second image 125 may be spatially registered.

As shown in FIG. 2, a parameter set of the artificial neural network 130 may be accessed at block 210. For example, the parameter set may be accessed from the parameter data storage 115. The parameter set includes weights that are associated with artificial neurons within the artificial neural network 130. The weights may be set to various initial values. A variety of suitable artificial neural networks 130 may be used, such as U-Net or Seeing More Net. The artificial neural network 130 may be convolutional and/or dense. For example, a dense prediction neural network (a network that predicts a label for each pixel in the image) may be used as the artificial neural network 130.

The artificial neural network 130 may then be trained by using the image training data set and the parameter set to adjust some or all of the parameters associated with the artificial neurons within the artificial neural network 130, including the weights within the parameter set, at block 215. For example, the weights may be adjusted to reduce or minimize a loss function of the artificial neural network 130. Some methods that may be used to adjust the weights include the gradient descent method, Newton's method, the conjugate gradient method, the quasi-Newton method, and the Levenberg-Marquardt algorithm.

Various machine-learning techniques may be used to train the artificial neural network 130. Some embodiments may use supervised training methods to train the artificial neural network. For example, the artificial neural network 130 may include a convolutional neural network, and the artificial neural network 130 may be trained by identifying points, edges, connective elements, and/or correlations between attributes within the image 120 and the image 125. In the convolutional neural network, kernels may be used to perform convolution in the two-dimensional spatial domain to extract spatial features to be used as inputs for a subsequent layer. Alternatively, three-dimensional predictions may be performed using image z-stacks, such as from consecutive sections of a sample. Further, other artificial neural network architectures may be used. For example, neighboring waveforms may be incorporated to form a feature vector. Specifically, for each pixel location, the waveform at that pixel location and waveforms from neighboring locations may be stacked together. Further, in a multi-scale artificial neural network, the images may be downsampled in the spatial domain into a series of smaller images. The artificial neural network may be trained for each image, and the output may be fed into a master layer to generate a final output. In addition, some embodiments may use nonlinear logistic regression training method to train the artificial neural network.

As shown in FIG. 2, once the artificial neural network 130 has been trained, the trained artificial neural network 130 may be used to generate a virtually stained image of a second unstained tissue sample. The second tissue sample may include the same tissue type as the first tissue sample that was used to train the artificial neural network 130. Alternatively, the second tissue sample may include a different tissue type from the first tissue sample that was used to train the artificial neural network 130. The second tissue sample may include the same or a different health status as the first tissue sample that was used to train the artificial neural network 130, such as whether the tissue is healthy or diseased with various types of disease and/or severity of disease. An image of the unstained second tissue sample may be accessed at block 220. The image includes a plurality of spectral images of the unstained second tissue sample. For example, the image may be accessed from the image sample data storage 140 or the image sample data storage 141. The trained artificial neural network 130 then uses the image to generate a virtually stained image of the second tissue sample at block 225. The virtually stained image may be generated based on the parameters of the artificial neural network 130 that are adjusted during the training. The virtually stained image may then be output at block 230. For example, the virtually stained image may be transmitted, stored, and/or displayed on various devices.

The virtually stained image may be further processed by various methods. For example, tumor cells in the virtually stained image may be distinguished from normal cells. Further, tumor cells in the virtually stained image may be counted and/or labelled. In addition, the virtually stained image may be processed to suggest a diagnosis and/or a grade for a patient's disease. For example, the probability of different diagnoses may be estimated based on the virtually stained image.

In one example, the image training dataset may be generated by using a microscope in a hyperspectral mode to acquire hyperspectral images, and a color imaging mode to acquire color images. A hyperspectral image includes a plurality of spectral images, each of which is a two-dimensional spatial image that includes data from a different wavelength band. For example, the hyperspectral image may include tens or hundreds of spectral images that have bandwidths between 10 nm and 20 nm, or bandwidths less than 10 nm, such as between 1 nm and 6 nm. The hyperspectral image may be generated via different excitation and/or emission wavelengths. The spectral images may combined to form a three-dimensional $(x,y,\lambda)$ hyperspectral data cube for processing and analysis, where x and y represent two spatial dimensions, and $\lambda$ represents the spectral dimension. A color image typically includes three colors, such as red, green, and blue. Alternatively, a grayscale image having shades of gray may be generated instead of a color image. As yet another example, the color image may include multiple colors from a sample that is stained with multiple dyes. The number of colors in the color image is not limited to three, and may include more than three colors.

The microscope may simultaneously collect spectrally resolved autofluorescence images from the sample when operating in the hyperspectral mode. Autofluoresence refers to the natural emission of various wavelengths of light by biological structures such as mitochondria and lysosomes after absorbing light of other wavelengths. In contrast to images acquired by other modalities, such as bright field imaging, the hyperspectral autofluorescence images carry information about the molecules within the sample. In particular, as shown in the examples below, the hyperspectral autofluorescence images carry sufficient molecular information for use in simulating various types of staining, such as H&E staining, CD68 IHC staining, and CD163 IF staining. Alternatively, the microscope may collect spectrally resolved spontaneous or stimulated Raman emission from the sample. As another example, the microscope may collect spectrally resolved multi-photon emission from the sample. Additional examples include hyperspectral reflectance or absorption, multi-photon fluorescence, second harmonic generation (SHG), and third harmonic generation (THG). More generally, the microscope may collect various types of spectrally resolved intrinsic signal from the sample. A spectrally resolved signal includes portions for a wavelength or a range of wavelengths. An intrinsic signal is generated by the sample, and may include spontaneous or stimulated emission.

In another example, the image training dataset may be generated by using a microscope in a multispectral mode to acquire multispectral images, and a color imaging mode to acquire color images. A multispectral image includes a plurality of spectral images, each of which is a two-dimensional spatial image that includes data from a different wavelength band. For example, the hyperspectral image may include 3 to 15 spectral images that have bandwidths between 50 nm and 150 nm. The multispectral image may be generated via different excitation and/or emission wavelengths. The spectral images may be combined to form a three-dimensional $(x,y,\lambda)$ multispectral data cube for processing and analysis, where x and y represent two spatial dimensions, and $\lambda$ represents the spectral dimension. The microscope may have a plurality of spectral channels that are used sequentially to generate a multispectral image. An example of parameters that may be used for acquiring the multispectral images is shown in Table 1.

| | Name | Excitation wavelength (nm) | Emission wavelength (nm) | Exposure time (ms) |
|---|---|---|---|---|
| 1 | ExEm__1__1 | 355-385 | 430-500 | 100 or 50 |
| 2 | ExEm__1__2 | 355-385 | 500-550 | 100 |
| 3 | ExEm__1__4 | 355-385 | 570-650 | 100 |
| 4 | ExEm__2__1 | 390-420 | 430-500 | 100 |

-continued

| | Name | Excitation wavelength (nm) | Emission wavelength (nm) | Exposure time (ms) |
|---|---|---|---|---|
| 5 | ExEm_2_2 | 390-420 | 500-550 | 100 |
| 6 | ExEm_2_4 | 390-420 | 570-650 | 100 |
| 7 | ExEm_3_2 | 435-460 | 500-550 | 150 |
| 8 | ExEm_3_4 | 435-460 | 570-650 | 150 |
| 9 | ExEm_4_2 | 460-490 | 500-550 | 150 |
| 10 | ExEm_4_4 | 460-490 | 570-650 | 150 |
| 11 | ExEm_5_4 | 490-515 | 570-650 | 200 |
| 12 | ExEm_5_5 | 490-515 | 655-705 | 200 |
| 13 | ExEm_6_4 | 530-560 | 570-650 | 200 |
| 14 | ExEm_6_5 | 530-560 | 655-705 | 200 |
| 15 | ExEm_7_5 | 615-645 | 655-705 | 300 |
| 16 | ExEm_1_7 | 355-385 | 705-845 | 100 |
| 17 | ExEm_2_7 | 390-420 | 705-845 | 100 |
| 18 | ExEm_3_7 | 435-460 | 705-845 | 150 |
| 19 | ExEm_4_7 | 460-490 | 705-845 | 150 |
| 20 | ExEm_5_7 | 490-515 | 705-845 | 200 |
| 21 | ExEm_6_7 | 530-560 | 705-845 | 200 |
| 22 | ExEm_7_7 | 615-645 | 705-845 | 300 |
| 23 | ExEm_8_7 | 650-675 | 705-845 | 300 |
| 24 | Brightfield | N/A | N/A | 1 |

Figures 3A, 3B:
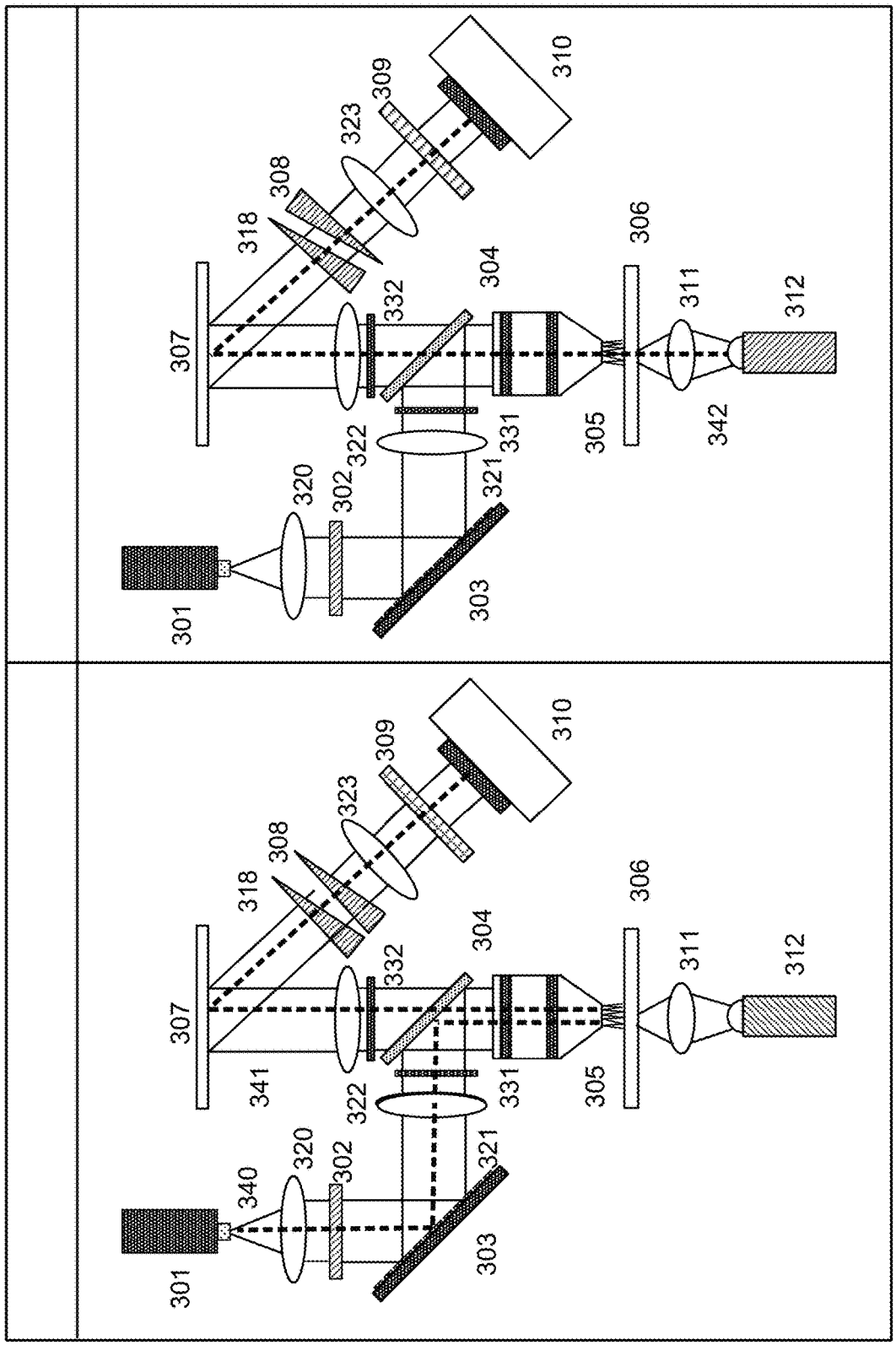
FIG. 3(a) shows a diagram of a microscope that is configured to operate in a hyperspectral mode.
FIG. 3(b) shows a diagram of a microscope that is configured to operate in a color imaging mode.

FIG. 3(a) shows a diagram of a microscope that is configured to operate in the hyperspectral mode, and FIG. 3(b) shows a diagram of a microscope that is configured to operate in the color imaging mode. In each figure, the path of the light is illustrated by the dashed line. More detailed descriptions of various components and operation of the microscope shown in FIG. 3(a) can be found in U.S. application Ser. No. 15/607,457 filed on May 27, 2017 and U.S. application Ser. No. 15/607,455 filed on May 27, 2017. Each of these applications is hereby incorporated by reference in its entirety for all purposes. As shown in FIG. 3(a), in the hyperspectral mode, a light source 301, such as a laser or a light emitting diode (LED), emits excitation light 340 at a suitable wavelength, such as 405 nm. In other embodiments, a plurality of wavelengths from a single light source 301 or a plurality of light sources 301 may be used. The excitation light 340 is collimated by a lens 320 and passes through a laser line filter 302 that transmits light at the wavelength(s) emitted by the light source 301. The excitation light 340 is then incident on a digital micromirror device (DMD) 303, which may structure the excitation light 340 by modulating the phase or amplitude of the excitation light 340 by selectively actuating or switching the micromirrors of the DMD 303. At least a portion of the micromirrors of the DMD 303 reflect the excitation light 340 toward a lens 321 and an optical filter 331. As an alternative to the DMD 303, another suitable spatial light modulator may be used. For example, cylindrical lenses may be used, either as singular elements or as an array. As other examples, scanned lenslet arrays or reflective components may be used. A beamsplitter 304 such as a dichroic mirror then reflects the excitation light 340 toward a microscope objective lens 305, which focuses the excitation light 340 on a sample 306.

The excitation light 340 that is incident on the sample 306 causes biological structures within the sample 306 to emit autofluorescence light 341. The autofluorescence light 341 is collected and/or collimated by the microscope objective lens 305. The autofluorescence light 341 then passes through the beamsplitter 304, an optical filter 332, and a lens 322, after which it is reflected by a mirror 307. The beamsplitter 304 blocks the excitation light 340 from progressing into the detection system. The autofluorescence light 341 is then dispersed by a pair of double Amici prisms 308 and 318, focused by a lens 323, and imaged by a camera 310. A more detailed description of the pair of double Amici prisms 308 and 318 can be found in U.S. application Ser. No. 15/481,385, filed on Apr. 6, 2017. This application is hereby incorporated by reference in its entirety for all purposes. The dispersion of the light may be maximized by aligning the double Amici prisms 308 and 318 such that an angle of rotation between the double Amici prisms 308 and 318 about the optical axis is 0°. In other embodiments, various dispersive elements may be used in place of the double Amici prisms 308 and 318, such as gratings or Jansen prisms. For example, the camera 310 may be a two-dimensional imaging device such as an sCMOS camera, which uses a hybrid charge-coupled device (CCD) and complementary metal-oxide-semiconductor (CMOS) architecture. In one example, CMOS readout integrated circuits (ROICs) may be bump bonded to a CCD imaging structure. In another example, a CCD-like structure may be implemented in CMOS technology. A color filter 309 is removed from the beam path in the hyperspectral mode shown in FIG. 3(a). The spectra may be measured in a sequence by using different filters.

Once the first image 120 of the unstained sample 306 has been collected in the hyperspectral imaging mode shown in FIG. 3(a), the sample 306 may be stained with a suitable dye, such as H&E, and the microscope may be modified as discussed below to operate in the color imaging mode shown in FIG. 3(b). As shown in FIG. 3(b), white light 342 from an LED 312 is focused on the sample 306 by a high numerical aperture condenser lens 311. For example, the LED may have a color temperature of approximately 3000 K, and the high numerical aperture condenser lens 311 may have a numerical aperture of approximately 0.7. The white light 342 then passes through the microscope objective lens 305, the beamsplitter 304, the optical filter 332, and the lens 322, after which it is reflected by the mirror 307. The pair of double Amici prisms 308 and 318 may be set to zero dispersion or a minimum dispersion in the color imaging mode. For example, one of the double Amici prisms 308 may be rotated by 180° about the optical axis with respect to the other double Amici prism 318. The color filter 309, which may include three independent color filters, is then used to transmit red, blue, and green channels sequentially to the camera 310. Each image 125 acquired in the color imaging mode indicates an extent to which the stain binds to the sample 306 as a function of the spatial locations of the sample 306. Each spatial location includes red, blue, and green components. As discussed above, although FIG. 3(b) is described as a color imaging mode that generates color images, a similar technique could also be used to generate grayscale images.

Figures 4A, 4B:
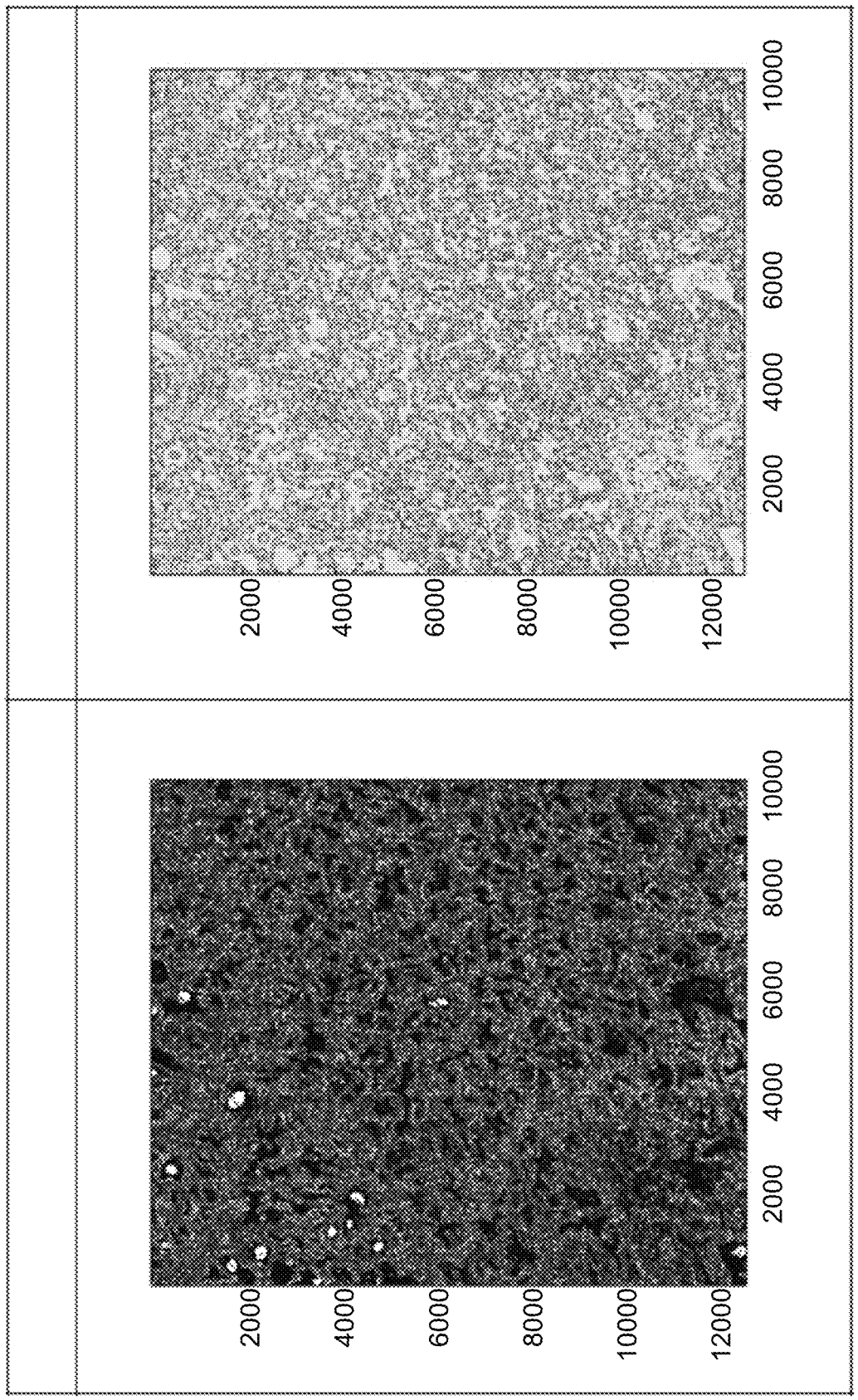
FIG. 4(a) shows an image of an unstained sample that was acquired in hyperspectral mode.
FIG. 4(b) shows an image of a stained sample that was acquired in color imaging mode.

FIGS. 4(a) and 4(b) show an example of an image pair of a formalin-fixed, paraffin-embedded (FFPE) prostate tissue sample that was acquired by the methods discussed above. FIG. 4(a) is an image 120 of an unstained sample that was acquired in hyperspectral mode, and FIG. 4(b) is an image 125 of the same sample that was acquired in color imaging mode after the sample was stained with H&E. For each image pair, the image 120 and the image 125 may be spatially registered, such that each pixel in the image 120 is associated with a respective pixel in the image 125, and/or each pixel in the image 125 is associated with a respective pixel in the image 120.

In order to spatially register the image 120 and the image 125, the sample 306 may be mounted on the same slide holder within the microscope before and after staining. In this example, because the same microscope objective lens 305 and camera 310 are used in the hyperspectral mode and the color imaging mode, any registration errors between the image 120 and the image 125 within an image pair are minimized. It is possible to correct for mechanical shifts that may occur in the sample position before and after the sample is stained by shifting one of the images with respect to the other image. Further, the image 125 may be scaled by a suitable factor, such as within a range between 0.5 and 1.5, to account for the pixel size difference between the DMD 303 and the camera 310. The image 120 may be rotated by a suitable amount, such as within a range between 0 and 180 degrees, to ensure an accurate tiling alignment. The scaling and rotation factors may be determined based on the characteristics of the imaging system, or by an image processing analysis. Further, the image 125 may be transposed to ensure an accurate tiling orientation. The image 125 may then be registered to the corresponding image 120 by using an affine transformation by maximizing mutual information, such as by using the imregtform function in Matlab®. As an alternative to maximizing mutual information, cross-correlation may be used, and the cross-correlation may be filtered. Various alternative methods may be used to register the image 125 to the corresponding image 120. For example, the image 125 may be globally aligned with the corresponding image 120, and then the image 125 may be locally aligned with the corresponding image 120, such as by elastic transformation, similarity matching, and/or rigid transformation. Multiple local affines may be used. Alternatively, a non-rigid transformation such as global or local warping could be used. As another example, B-spline interpolation may be used.

Figure 5:
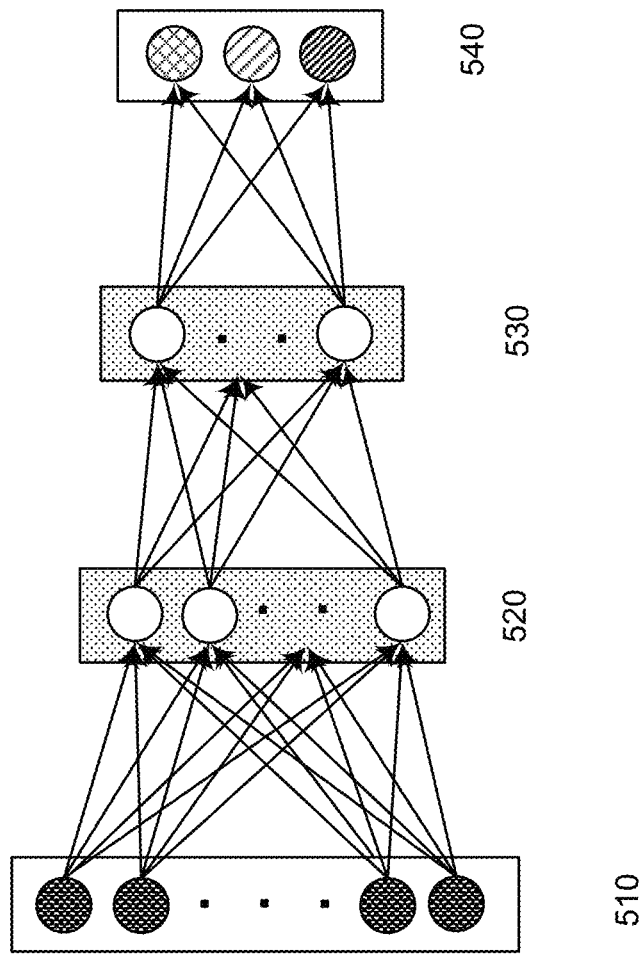
FIG. 5 shows an example of a structure of an artificial neural network.

FIG. 5 shows an example of a structure of the artificial neural network 130. In this example, an input layer 510 includes a plurality of dimensions corresponding to the number of spectral channels, each of which has a different wavelength band, in each of the images 120. For example, the input layer 510 may include 140 dimensions corresponding to 140 spectral channels between 400 nm and 800 nm for each spatial pixel in the image 120. This fine spectral resolution may be used to generate high-quality virtual stained images, because different tissue elements, such as stroma, nuclei, and cytoplasm, have subtle differences in their spectral profiles and/or shapes.

As shown in FIG. 5, the artificial neural network 130 also includes hidden layers 520 and 530. Each of the hidden layers 520 and 530 includes a plurality of artificial neurons. Although two hidden layers are shown, the artificial neural network 130 may include various numbers of hidden layers. The artificial neural network 130 also includes an output layer 540, which may include three artificial neurons that are used to predict red, green, and blue values independently. Alternatively, the output prediction may include the underlying signals, which can be further selected, mixed, adjusted, and colored to red, green, and blue values. In another example, each output neuron may represent the concentration of one type of dye molecules. Any suitable number of output neurons may be used. For example, each output neuron may correspond to a staining signal from hematoxylin, eosin, CD68, and/or another type of dye molecule. The output layer 540 may include a suitable number of artificial neurons to predict a corresponding number of colors. The number of artificial neurons in each layer may be varied to yield the best results. In one example, the input layer 510 included 140 artificial neurons, the first hidden layer 520 included 70 artificial neurons, the second hidden layer 530 included 35 artificial neurons, and the output layer 540 included 3 artificial neurons. As discussed above, parameters of the artificial neural network 130, including weights of connections between the neurons within the hidden layers 520 and 530, are adjusted during the training of the artificial neural network 130.

Figure 6:
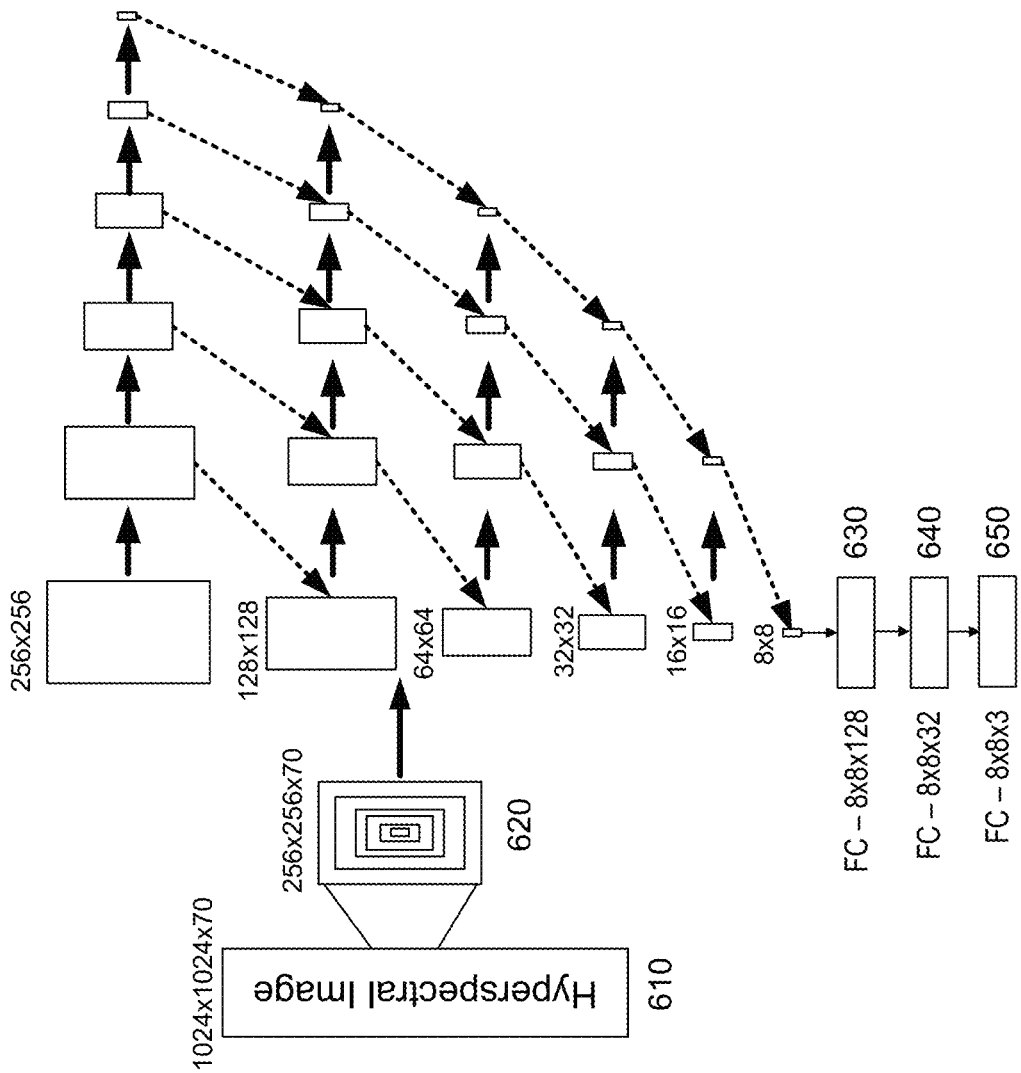
FIG. 6 shows an example in which hyperspectral images are used as features and color images are used as labels while training the artificial neural network.

FIG. 6 shows an example in which hyperspectral images are used as features and color images are used as labels while training the artificial neural network 130. As shown in FIG. 6, multiple 256×256 patches 620 are extracted from a hyperspectral image 610 and each patch 620 is used to create smaller concentric patches (128×128, 64×64, 32×32, 16×16, and 8×8). The patches 620 may be identified using a pseudo-random selection technique. Each patch 620 goes through multiple convolution and maximum pooling layers until it reaches a size of 8×8. In this example, two sequential 24 3×3 kernels having a stride size of 1 were used to perform convolutions from the previous layer, and 2×2 maximum pooling having a stride size of 2 was applied to reduce the image size by a factor of 2 on each layer until the image size reached 8×8. To align spatial features and maintain magnification, all maximum pooled patches were then up-resized (i.e. nearest neighbor interpolation) back to their original sizes and were cropped around the center to reduce the size of each patch by a factor of two. Same-sized patches were concatenated in between layers, such that the feature dimension was merged, as shown by the diagonal arrows. The final 8×8×n (n~500) layer is connected to a fully connected (FC) layer 630 with 8×8×128=8192 neurons and is then reduced to an FC layer 640 with 8×8×3=252 neurons, which are used to predict the RGB values of the 8×8 pixels in a co-registered color image 650.

Figures 7A, 7B:
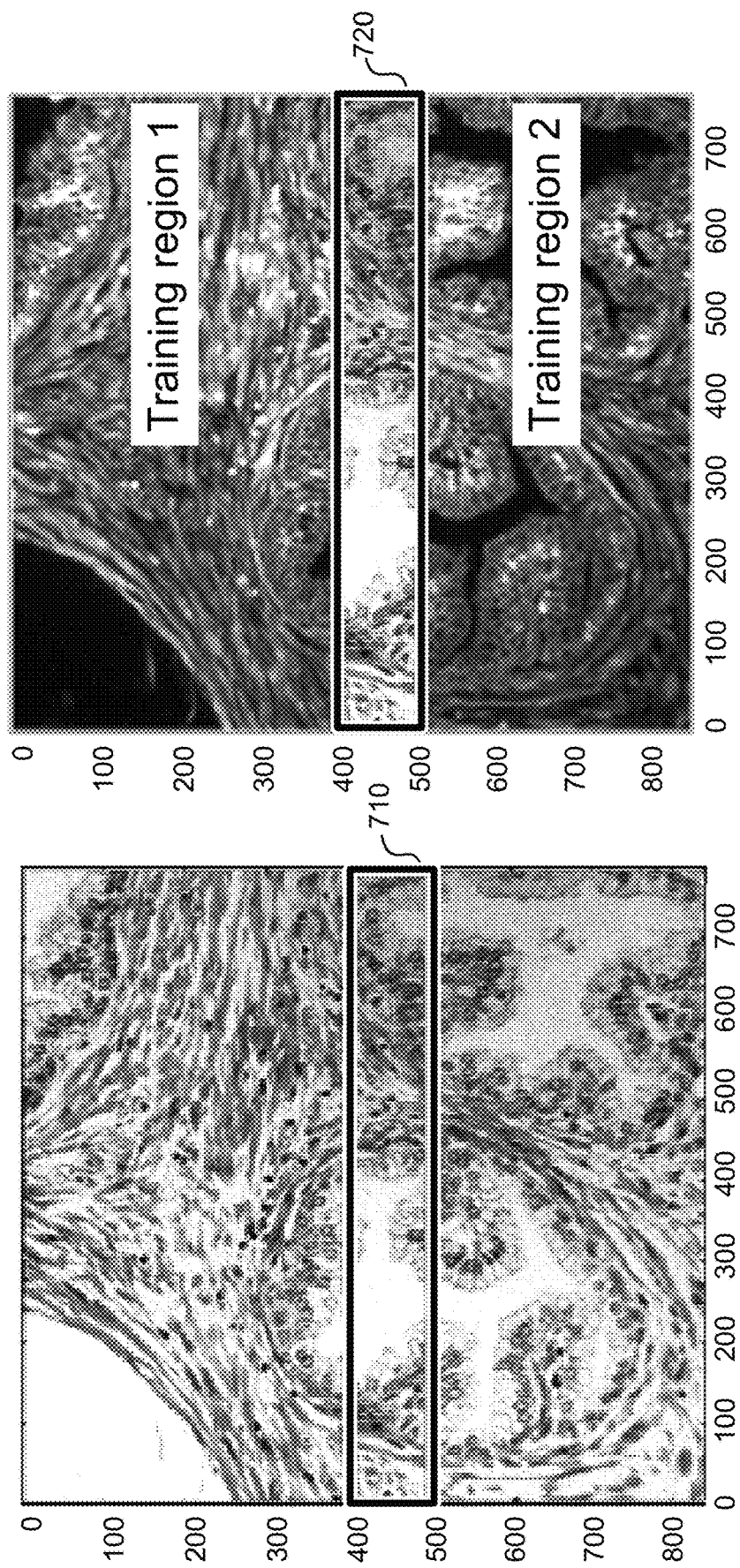
FIG. 7(a) shows an example of a color image of a prostate tissue sample that was stained with H&E.
FIG. 7(b) shows an example of a hyperspectral image of the prostate tissue sample shown in FIG. 7(a)

FIG. 7(a) shows an example of a color image of a prostate tissue sample that was stained with H&E. FIG. 7(b) shows an example of a hyperspectral image of the same prostate tissue sample. The artificial neural network 130 was trained by using the pixels in Training region 1 and Training region 2 of the image in FIG. 7(b). The trained artificial neural network 130 was then used to generate a virtually stained image within region 720 of the hyperspectral image shown in FIG. 7(b). A comparison of region 720 of FIG. 7(b) with corresponding region 710 of FIG. 7(a) shows that the virtually stained image closely resembles a color image of the sample that was stained with H&E.

Figure 8B:
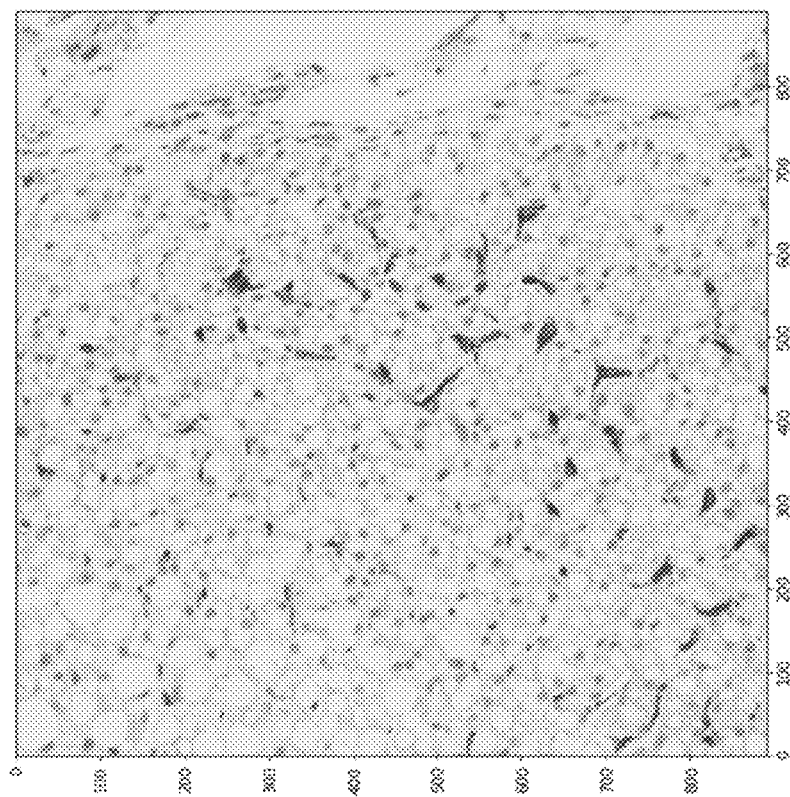
FIG. 8(b) shows an example of a color image of the liver tissue sample.
Figure 8A:
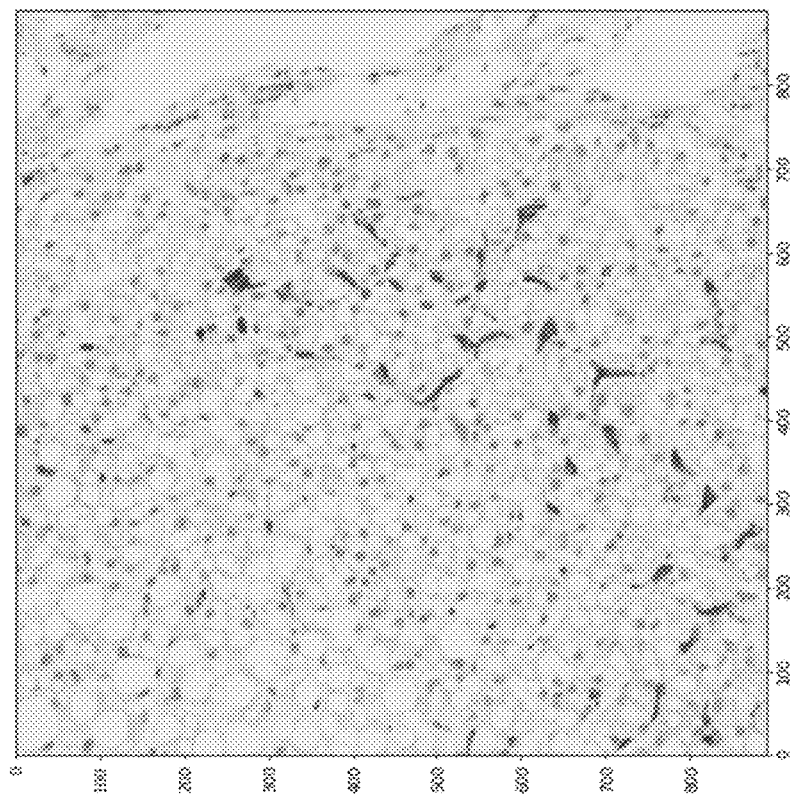
FIG. 8(a) shows an example of a virtually stained image of a liver tissue sample.

FIG. 8(a) shows an example of a virtually stained image of a liver tissue sample that was generated by the methods discussed above. FIG. 8(b) shows an example of a color image of a liver tissue sample that was stained with CD68 via IHC. A comparison of FIG. 8(a) with FIG. 8(b) shows that the virtually stained image closely resembles the color image of the sample.

In addition to training the artificial neural network 130 to predict staining of a tissue sample as discussed above, exemplary embodiments of the invention may train the artificial neural network 130 using whole cells that are deposited or cultured onto a slide, dish, or well. This provides for phenotypic prediction of bulk cell populations, such as mixed peripheral blood mononuclear cells (PBMCs), individual phenotypes from cell lines, and induced pluripotent stem cells (iPSCs). In addition, cell populations of interest may be embedded in microarrays and imaged to provide image training datasets for the artificial neural network 130. Exemplary embodiments of the invention may also provide for the detection and measurement of cell populations in blood smear.

In some embodiments, multiple artificial neural networks may be trained using tissue having different characteristics that may be produced by different types of tissue, different sample preparation methods, and/or different sample sources. For example, a first artificial neural network may be trained using prostate tissue, and a second artificial neural network may be trained using colon tissue. In this example, a sample including prostate tissue would be analyzed by the first artificial neural network, and a sample including colon tissue would be analyzed by the second artificial neural network. Alternatively, a single artificial neural network may be trained using tissue having different characteristics that may be produced by different types of tissue, different sample preparation methods, and/or different sample sources. In this example, samples including prostate tissue or colon tissue would be analyzed by the single artificial neural network. The dimensionality of the single artificial neural network would be increased to include a sufficient number of training parameters.

Exemplary embodiments of the invention may provide several advantages. For example, because the sample is not stained, the sample can be preserved and is not damaged by the staining process. In addition, because the sample does not need a coverslip for imaging, the sample can be used directly for downstream analyses such as proteomics and transcriptomics for personalized medicine applications. The sample may be evaluated in real time, and the sample can be prepared at the time of surgery. Further, the biological structure organization of the sample may be directly linked to endogenous fluorophores, which may add value to traditional pathology. In addition, spectral signals and morphological features can be used to infer underlying molecular signature in tissue.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
   accessing an image training dataset including a plurality of image pairs, wherein:
   each image pair of the plurality of image pairs includes a first image of a first tissue sample acquired when the first tissue sample is unstained, and a second image of the first tissue sample acquired when the first tissue sample is stained;
   the first image includes a first plurality of spectral images of the first tissue sample, and each spectral image of the first plurality of spectral images includes data from a different wavelength band; and
   the second image includes a plurality of colors that indicate, for each location of a plurality of locations within the second image, an extent to which at least one stain binds to the first tissue sample at the location;
   accessing a set of parameters for an artificial neural network, wherein the set of parameters includes weights associated with artificial neurons within the artificial neural network;

training the artificial neural network by using the image training dataset and the set of parameters to adjust the weights;
accessing a third image of a second tissue sample that is unstained, wherein the third image includes a third plurality of spectral images of the second tissue sample, and each spectral image of the third plurality of spectral images includes data from a different wavelength band;
using the trained artificial neural network to generate a virtually stained image of the second tissue sample from the third image; and
outputting the virtually stained image.

2. The computer-implemented method according to claim 1, further comprising, for each of the plurality of image pairs, spatially registering the first image with the second image such that each pixel in the first image is correlated with a respective pixel in the second image that is located at the same spatial coordinates.

3. The computer-implemented method according to claim 2, wherein spatially registering the first image with the second image comprises using an affine transformation by maximizing mutual information.

4. The computer-implemented method according to claim 1, wherein training the artificial neural network comprises using the first images as features and using the second images as labels.

5. The computer-implemented method according to claim 1, wherein an output layer of the artificial neural network comprises three artificial neurons that respectively predict red, blue, and green channels of the virtually stained image.

6. The computer-implemented method according to claim 1, wherein the artificial neural network is a convolutional neural network, and training the artificial neural network comprises identifying at least one of points, edges, connective elements, or correlations between attributes within the first image and the second image.

7. The computer-implemented method according to claim 1, wherein the second tissue sample comprises a tissue type that is the same as a tissue type of the first tissue sample.

8. A system comprising:
one or more data processors; and
a non-transitory computer readable storage medium containing instructions which when executed on the one or more data processors, cause the one or more data processors to perform actions including:
accessing an image training dataset including a plurality of image pairs, wherein:
each image pair of the plurality of image pairs includes a first image of a first tissue sample acquired when the first tissue sample is unstained, and a second image of the first tissue sample acquired when the first tissue sample is stained;
the first image includes a first plurality of spectral images of the first tissue sample, and each spectral image of the first plurality of spectral images includes data from a different wavelength band; and
the second image includes a plurality of colors that indicate, for each location of a plurality of locations within the second image, an extent to which at least one stain binds to the first tissue sample at the location;
accessing a set of parameters for an artificial neural network, wherein the set of parameters includes weights associated with artificial neurons within the artificial neural network;
training the artificial neural network by using the image training dataset and the set of parameters to adjust the weights;
accessing a third image of a second tissue sample that is unstained, wherein the third image includes a third plurality of spectral images of the second tissue sample, and each spectral image of the third plurality of spectral images includes data from a different wavelength band;
using the trained artificial neural network to generate a virtually stained image of the second tissue sample from the third image; and
outputting the virtually stained image.

9. The system according to claim 8, wherein the actions further include, for each of the plurality of image pairs, spatially registering the first image with the second image such that each pixel in the first image is correlated with a respective pixel in the second image that is located at the same spatial coordinates.

10. The system according to claim 9, wherein spatially registering the first image with the second image comprises using an affine transformation by maximizing mutual information.

11. The system according to claim 8, wherein training the artificial neural network comprises using the first images as features and using the second images as labels.

12. The system according to claim 8, wherein an output layer of the artificial neural network comprises three artificial neurons that respectively predict red, blue, and green channels of the virtually stained image.

13. The system according to claim 8, wherein the artificial neural network is a convolutional neural network, and training the artificial neural network comprises identifying at least one of points, edges, connective elements, or correlations between attributes within the first image and the second image.

14. The system according to claim 8, wherein the second tissue sample comprises a tissue type that is the same as a tissue type of the first tissue sample.

15. A computer-program product tangibly embodied in a non-transitory machine-readable storage medium, including instructions configured to cause one or more data processors to perform actions including:
accessing an image training dataset including a plurality of image pairs, wherein:
each image pair of the plurality of image pairs includes a first image of a first tissue sample acquired when the first tissue sample is unstained, and a second image of the first tissue sample acquired when the first tissue sample is stained;
the first image includes a first plurality of spectral images of the first tissue sample, and each spectral image of the first plurality of spectral images includes data from a different wavelength band; and
the second image includes a plurality of colors that indicate, for each location of a plurality of locations within the second image, an extent to which at least one stain binds to the first tissue sample at the location;
accessing a set of parameters for an artificial neural network, wherein the set of parameters includes weights associated with artificial neurons within the artificial neural network;
training the artificial neural network by using the image training dataset and the set of parameters to adjust the weights;
accessing a third image of a second tissue sample that is unstained, wherein the third image includes a third plurality of spectral images of the second tissue sample, and each spectral image of the third plurality of spectral images includes data from a different wavelength band;

using the trained artificial neural network to generate a virtually stained image of the second tissue sample from the third image; and outputting the virtually stained image.

16. The computer-program product according to claim 15, wherein the actions further include, for each of the plurality of image pairs, spatially registering the first image with the second image such that each pixel in the first image is correlated with a respective pixel in the second image that is located at the same spatial coordinates.

17. The computer-program product according to claim 16, wherein spatially registering the first image with the second image comprises using an affine transformation by maximizing mutual information.

18. The computer-program product according to claim 15, wherein training the artificial neural network comprises using the first images as features and using the second images as labels.

19. The computer-program product according to claim 15, wherein an output layer of the artificial neural network comprises three artificial neurons that respectively predict red, blue, and green channels of the virtually stained image.

20. The computer-program product according to claim 15, wherein the artificial neural network is a convolutional neural network, and training the artificial neural network comprises identifying at least one of points, edges, connective elements, or correlations between attributes within the first image and the second image.

* * * * *